3,567,471
NONSETTLING THIXOTROPIC COLD BOTTOM FILLER COMPOSITION
George F. Kahle, 1600 Long-Valley Road, Glenview, Ill. 60025
No Drawing. Filed May 16, 1967, Ser. No. 638,723
Int. Cl. A43b *13/42;* C08f *45/20;* C09k *3/00*
U.S. Cl. 106—38                                   5 Claims

ABSTRACT OF THE DISCLOSURE

A nonsettling thixotropic composition capable of setting to a pliable solid when exposed to the atmosphere and particularly suited for use as a cold bottom filler in the construction of shoes which is formed of a binder material containing a resinous film forming material dissolved in one or more volatile solvents and containing asbestos fiber particles or equivalent inert thickeners and gellants as a thixiotropy producing agent in an amount sufficient to maintain the binder material in a thixotropic state and having solid particulate material, such as granulated cork, uniformly distributed throughout the thixotropic binder material.

The nonsettling thixotropic composition is prepared by first mixing the binder material ingredients to form the thixotropic binder and thereafter uniformly distributing the solid particulate material throughout the thixotropic binder material.

---

This invention relates generally to a composition for making flexible filler materials and more particularly to an improved composition for making a cold bottom filler used in the construction of shoes, and to an improved method of making said composition.

A bottom filler composition used in the construction of shoes is comprised of a mixture of particulate insulation material, such as granulated cork or the like, suspended in a liquid viscous binder which can be spread or molded into any desired form and which will solidify to form a flexible solid. Bottom filler compositions which are normally hard at room temperature and which must be heated in order to permit spreading or casting into a desired form are known as "hot bottom fillers." These hot bottom fillers have certain inherent disadvantages, such as softening due to the heat from the wearer's foot and permitting the filler to creep and slide during use of the shoe, with the result that the shoe becomes deformed and uncomfortable to wear.

The bottom filler compositions which are normally soft at room temperature and which solidify or set to form a flexible solid when exposed to the atmosphere are known as "cold bottom fillers." While the cold bottom fillers do not soften after solidification thereof, they also have certain objectionable features. One of the more serious objections to the presently known cold bottom fillers is the tendency of the liquid binder component to separate or settle out from the solid particulate material suspended therein during preparation, storage and use of the composition. The settling out of the liquid binder begins after preparation and continues during shipping and storage. It is, therefore, necessary to mix the ingredients of the known cold bottom filler compositions immediately before use to insure a uniform suspension of the particulate matter in the liquid binder.

The separation of the liquid and solid components of the previously known cold bottom filler compositions also occurs during use and creates problems which add to overall cost of making shoes and sometimes results in making deformative shoes. Present cold bottom fillers are used only with difficulty in the "glued on rib" construction of shoes, wherein a strip or "rib" of material is adhesively secured to the bottom side of a shoe insole, because settling of the binder results in the binder attacking the adhesive which holds the rib, thereby causing the rib to slide and deformatives occurring in the shoe.

It is, therefore, an object of the present invention to overcome the several disadvantages found in the prior art composition of the foregoing types and provide an improved thixotropic composition which does not settle out or separate into liquid or solid fractions on standing.

Another object of the present invention is to provide a cold bottom filler-type composition which has a thixotropic binder component with solid particulate material uniformly suspended therein.

It is a further object of the invention to provide cold bottom filler-type compositions having a binder which does not flow from a container thereof when the container is accidentally punctured or broken during storage or transit.

Another object of the present invention is to provide a cold bottom filler composition which can be used more rapidly and more economically in the "glued on rib" construction of shoes.

It is still a further object of the present invention to provide an improved method of making a liquid composition suitable for making filler material, and particularly an improved method for making a cold bottom filler-type composition which does not separate into a liquid and a solid fraction on standing.

Other objects, purposes, and advantages of the present invention will be apparent to those skilled in the art from the following detailed description of the invention and the claims to follow.

It has now been discovered that by incorporating in any conventional binder for a solid material in particulate form of the type used in cold bottom filler compositions or the like composition, preferably prior to suspending the particles of solid material in the binder, a quantity of a thixotropic agent, such as fiber particles and preferably asbestos fiber particles, or equivalent thickeners and gellants in an amount sufficient to maintain the binder material in a thixotropic state, it is possible to overcome the normal tendency of the liquid components of the binder material to separate or settle out from the particles of solid material suspended therein, and thereby overcome the principle objectionable features of the prior art cold bottom filler-type compositions.

The improved nonsettling, thixotropic composition of the present invention consists generally of a particulate solid material, such as ground or granulated cork or the like material, uniformly suspended in a viscous liquid binder material which is made thixotropic so that the binder is substantially nonsettling and nonflowable until force or pressure is applied thereto. These compositions can be used in constructing shoes and making insulation materials without changing the normal manufacturing procedures.

In forming the improved composition of the present invention, any conventional lacquer-like or viscous binder ingredients which are commonly used in the preparation of the flexible plastic products can be used. In the preparation of these compositions, such as cold bottom filler-type compositions, the liquid binder component generally comprises a resinous or plastic material or the like film forming material which can be either natural or synthetic and usually dissolved in a volatile solvent therefore. The film former material is also usually mixed with sufficient plasticizer to provide the desired degree of flexibility after the volatile solvents have evaporated, although in some instances the resinous material used will be sufficiently pliable on setting without the use of plasticizers. While any of the usual film forming materials which are capable of setting to a solid on standing can be used in the binder of the present invention, it has been found that highly satisfactory film forming material are nitrocellulose, vinyl plastic compositions, cellulose acetate, cellulose acetate butyrate, ethyl cellulose, cellulose acetate phthalate, abietic acid and modified abietic acid resins, and other natural and chemically modified and derived pine resin products. Other resinous material, both synthetic an natural, which have equivalent binding properties for particulate material can be used in the present invention and many such resinous film forming materials will occur to those skilled in the art. The resinous ingredients can be combined, if desired, to provide the properties desired in the final product.

It will be understood that the particular solvents and plasticizers for the resin which is used in forming the foregoing binder material will depend on the particular resin or film forming material used. Any of a large number of volatile solvents can be used. Among the commercially available and preferred volatile organic solvents which can be used are alcohols, aromatic and aliphatic hydrocarbons, ketones, acetates, including methyl alcohol, heptane, acetone and ethyl acetate. Similarly, the plasticizers which can be used include dioctyl phthalate, dibutyl phthalate, tricresyl phosphate and castor oil. It will be understood, however, that any other plasticizers for the particular resin material used in the binder can be used in the present invention.

The preferred thixotropic agent used in the composition of the present invention to render the liquid binder thixotropic is fibrous asbestos particles. The fibrous asbestos particles, in addition to having the property of making the liquid binder thixotropic, also have insulating and absorption properties and are substantially inert to the various solvents, plasticizers and film formers used in the binder. Any of the commercially available asbestos fibers and asbestos shorts which are free of objectionable impurities can be used in the composition of the present invention.

The most readily available asbestos materials which can be used in the present invention are chrysotile "asbestos fibers" and chrysotile "asbestos shorts" which are produced in Canada. According to Canadian Asbestos Classification, the standard group designations for an "asbestos fiber" material are Gorups 3, 4, 5 or 6, with further grade and subgrade designations, and thus range from the longest "fiber" material of Group 3, such as 3F, 3K, 3R, 3T, 3T-1 and 3Z, to the shortest "fiber" material of Group 6 which has further grade or subgrade designations, such as 6D, 6D-1 and 6D-5. The standard group designation for an "asbestos short" material is in Group 7 and the "shorts" are further classified into grades and subgrades, such as 7D, 7D-1, 7F, 7H, 7K, 7K-1, 7KS-1, 7M, 7MS-1, 7M-5, 7R, 7RS-1, 7T, 7TS-1, 7RF (floats), 7TF (floats) and 8S.

The asbestos fiber materials preferred in the present invention are the Group 7 "asbestos shorts" and particularly the "asbestos shorts" having a high absorption capacity for the solvents and/or plasticizers in the binder material, such as the products designated 7D-1, 7MS-1 and 7MO5. It has been found, for example, that a much smaller amount of asbestos material having a higher absorption capacity for the solvents and/or plasticizer is required to provide thixotropy in the binder composition than is required when a less absorptive asbestos fiber material is used and the resultant product is more resilient when a smaller amount of asbestos material is used. As shown in the specific examples to follow, about 6% by weight of the very short asbestos "floats" (Example 2) which have a low absorption capacity for the solvents and/or plasticizer is required to render the binder thixotropic, whereas only about 2.6% by weight of the asbestos "short" material (Example 1) having a high absorption capacity for the solvents and/or palsticizer is required to effect the same degree of thixotropy in a similar binder composition. When all factors are considered, the most desirable asbestos materials for use in the present invention are "asbestos shorts" in Group 7 having both a high absorptive capacity and a relatively long fiber length, since the longer fiber length adds flexibility, coherents, and resistance to heat, wear, breakage and abrasion to the final product, in addition to rendernig the composition thixotropic.

Among the commercially available asbestos fiber materials which can be used as a thixotropic agent in preparing the composition of the present invention are Grant Wilson, Inc., Chicago, Ill., asbestos fiber material sold under the grade designation 7RF636, 7TF924, 7MF5 and 7D635; the Johns-Manville, Inc., U.S.A., asbestos fiber material sold under the grade designation 7RF1, 7MO5, 7M15 and 4K15; and Carey-Canadian Mines, Limited fiber material sold under the grade designations 7D-3, 7MS1, 7FS-1 and 7TS-1.

While "chrysotile asbestos" has been used as the preferred material for providing the desired thixotropic binder composition, it should be understood that many silicate mineral materials which occur preferably in an elongated fibrous form can be used in the present invention when processed to have the characteristics of conventional asbestos fiber material. Among the asbestos-like materials which can be used and which are intended to be included within the meaning of the term "asbestos" are the asbestos producing minerals actinolite, amosite, anthothyllite, hornblende, crocidolite and tremolite.

As previously indicated, other thickners or gellants can be used to make the viscous liquid binder of the present invention thixotropic and among these are other fibrous materials, both natural and synthetic, including nylon fibers, cotton fibers, rayon fibers and the commercially available thickeners and gellants, including Aerosil, Cabosil, Bentone, which is a chemically treated bentonite product having swelling properties, and other like inert silicate mineral materials.

The preferred solid particulate material or filler materials suspended in the thixotropic binders to form the composition of the present invention and which have resilient properties and a low density, is shredded or granulated cork, either virgin or reprocessed. When making a cold bottom filler-type composition, the shredded or granulated cork preferably has a particle size ranging between about 10–60 mesh. It will be understood, however, that cork having both larger and smaller particle sizes can be used depending on the particular use of the cold bottom filler composition or in similar compositions for making gasket material or the like.

Other particulate solid insulating materials can be used in place of the preferred cork and among these are expanded natural and synthetic elastomer and plastic materials and the like resilient, low density materials in particulate form which are not attacked or solubilized by the solvents in the composition. It is also possible to use other natural and synthetic materials as the filler material in particulate form, depending on the particular properties desired in the final product.

In preparing a cold bottom filler-type composition in accordance with the present invention, the ingredients of a conventional formulation on a weight basis generally ranges between about 70% to 95% thixotropic binder and about 5% to 30% particulate material. The relative percentages can, however, vary considerably depending upon the size and specific gravity of the particles of solid material and the desired degree of wetness or dryness desired in the final product. In general, the finer the particles of solid material, such as cork, the greater amount of binder material required to give a satisfactory consistency to the product. For example, if very finely powdered cork is used, the formula would include about 5% cork and 95% binder, and, where the cork has a particle size between about 10–60 mesh, the formulation will usually contain between about 10% to 30% by weight cork with the balance being comprised of the thixotropic binder. It should be understood, however, that a composition having the foregoing proportion of ingredients appears to consist substantially entirely of cork, because of the relatively low density of the cork compared with the relatively high density of the thixotropic binder. A typical thixotropic binder of the present invention is comprised on a weight basis of about 8 to 17% film former, 1 to 10% thixotropic agent, 40 to 75% solvent, and 12 to 30% plasticizer.

The following specific examples are given for the purpose of further illustrating the present invention, but should not be construed to limit the invention to the specific ingredients or proportions used.

EXAMPLE 1

A cold bottom filler composition was prepared containing the following ingredients:

| | Percent by weight |
|---|---|
| Nitrocellulose (1000–1500, 30% wet) | 4.66 |
| "Vinsol" resin (pine wood resin chemically modified) | 2.46 |
| "Penbro" rosin (limed wood rosin) | 2.46 |
| Asbestos fibers (Grant Wilson, Inc., 7RF636) | 6.50 |
| Methyl alcohol | 24.00 |
| Acetone | 16.50 |
| Heptane | 9.00 |
| Dioctyl phthalate | 15.92 |
| Cork (10–60 Mesh) | 18.50 |

The nitrocellulose, pine resin, rosin and dioctyl phthalate plasticizer were uniformly mixed with the indicated amounts of heptane, methanol and acetone solvents to form a uniform viscous liquid solution. Thereafter, the asbestos fiber material was uniformly dispersed in the liquid binder with mixing to form a thixotropic binder material. The cork particles having the indicated size were then thoroughly mixed in the thixotropic binder material to form a uniform suspension of cork particles in the binder.

EXAMPLE 2

A cold bottom filler composition was prepared in accordance with Example 1 from the following ingredients:

| | Percent by weight |
|---|---|
| Nitrocellulose (1000–1500, 30% wet) | 5.5 |
| "Vinsol" resin (pine wood resin chemically modified) | 2.4 |
| "Penbro" rosin (limed wood rosin) | 2.4 |
| Asbestos fibers (Carey-Canadian, 7MS1) | 2.6 |
| Methyl alcohol | 24.0 |
| Acetone | 18.3 |
| Heptane | 11.2 |
| Dioctyl phthalate | 15.2 |
| Cork (10–60 mesh) | 18.4 |

The formulation of Example 1 contains very short asbestos fiber material (i.e., "asbestos floats") of Group 7 which has a low absorption capacity for the solvents and plasticizer, whereas, the formulation of Example 2 contains milled "asbestos short" fiber material of Group 7 having high bulk and absorption properties.

The cold bottom filler composition of the foregoing examples remained homogeneous without settling out of the binder from the cork particles on standing and could be readily spread when used in the "glued on rib" construction of shoes. Thereafter, the solvent evaporated to cause setting of the filler composition without any settling out of the binder, and the filler composition remained resilient and pliable during normal shoe wearing activity. There was no tendency for the composition to attack the adhesive holding the "rib," and it was unnecessary to allow the partially constructed shoe having the cold bottom filler composition applied thereto to remain on the shoe last overnight before applying the outsole thereto, thereby greatly speeding up the rate of shoe production and substantially reducing the cost of shoe construction.

Other cold bottom filler compositions were prepared having a formulation as in Examples 1–2, but having in place of the asbestos fiber material an equivalent amount of nylon fiber or rayon fibers in particulate form, or cotton linters. The foregoing fibers were used in a concentration of between 2–3% by weight. Also, a cold bottom filler composition was made as in Example 1, with the same ingredients, except that 1 to 5% "Bentone 27," a suspending or bodying agent for organic systems sold by National Lead Co. and comprising an organic derivative of hydrous magnesium aluminum silicate, was used in place of the asbestos fiber material.

It should be understood that modifications and variations can be effected without departing from the scope of the novel concepts of the present invention and that this application is to be limited only by the scope of the appended claims.

I claim:

1. A cold bottom filler composition which sets to a pliable resilient solid particularly adapted for use in a glued-on-rib shoe construction comprising; a binder material comprised essentially of a uniform mixture of between about 8% and 17% by weight of a resinous material selected from the group consisting of nitrocellulose, vinyl plastic, cellulose acetate, cellulose acetate butyrate, cellulose acetate phthalate, ethyl cellulose, abietic acid resin, thermoplastic resin derived from pine wood, limed wood resin and mixture thereof dissolved in between about 40% and 75% by weight of a liquid volatile organic solvent for said resinous material selected from the group consisting of methyl alcohol, heptane, acetone and ethyl acetate with said resinous material containing between about 12% and 30% by weight of a plasticizer for the said resinous material selected from a group consisting of dioctyl phthalate, dibutyl phthalate, tricresyl phosphate, and castor oil, said viscous binder material having uniformly mixed therewith about 1% and 10% by weight of solid particulate fiber material selected from a group consisting of asbestos fibers, asbestos floats and asbestos shorts, nylon fiber, rayon fiber, cotton fibers and cotton linters, and said binder material being admixed with between about 5% and 30% by weight of a resilient low density solid particulate material selected from a group consisting of ground cork, granlated cork and shredded cork to coat said low density solid particulate material with said binder material and from said cold bottom filler composition which is stabilized against separation into said liquid and solid components on standing and is nonflowing until pressure is applied thereto, whereupon said composition is spreadable into a thin layer in a shoe construction without causing separation of said liquid organic solvent from the remainder of said composition.

2. A cold bottom filler composition as in claim 1, wherein said solid particulate fiber material is an asbestos fiber of Group 7.

3. A cold bottom filler composition as in claim 2, wherein said solid particulate fiber material is a milled asbestos short fiber material of Group 7 having high bulk and absorption properties.

4. A cold bottom filler composition as in claim 1, wherein said resinous material is a uniform mixture of about equal amounts of nitrocellulose and a mixture of thermoplastic resin derived from pine wood and limed wood rosin and together forming about 10% by weight of said composition dissolved in about 50% by weight of said solvent comprising a mixture of methyl alcohol, acetone and heptane, said resinous material having about 16% by weight dioctyl phthalate as the plasticizer mixed therewith, said binding material being uniformly mixed with about 7% by weight of said particulate fiber material in the form of asbestos floats of Group 7, and said binder material being uniformly mixed with about 19% by weight of said particulate cork material having a particulate size between about 10 and 60 mesh.

5. A cold bottom filler composition as in claim 1, wherein said resinous material is a uniform mixture of about equal amounts of nitrocellulose and a mixture of thermoplastic resin derived from pine wood and limed wood rosin and together forming about 10% by weight of said composition dissolved in about 54% by weight of said solvent comprising a mixture of methyl alcohol, acetone and heptane, said resinous material having about 15% by weight dioctyl phthalate mixed therewith as a plasticizer, said binding material being uniformly mixed with about 3% of said particulate fiber material which is in the form of asbestos shorts of Group 7, and said binder material being uniformly fixed with about 18% by weight of said particulate cork material having a particulate size between about 10 and 60 mesh.

References Cited

UNITED STATES PATENTS

| | | | |
|---|---|---|---|
| 1,203,229 | 10/1916 | Merrick | 106—38 |
| 2,293,805 | 8/1942 | Cooke et al. | 106—242 |
| 2,348,674 | 5/1944 | Dodge et al. | 106—38 |
| 2,350,252 | 5/1944 | Sackett | 106—200 |
| 3,420,791 | 1/1969 | Gurgiolo et al. | 260—41A |

FOREIGN PATENTS

| | | | |
|---|---|---|---|
| 784,391 | 10/1957 | Great Britain | 23—82 |

ALLAN LIEBERMAN, Primary Examiner

U.S. Cl. X.R.

36—12; 42—142, 148; 106—172, 173, 193, 220, 236, 240, 241, 243; 260—17.4, 31.2, 31.8, 32.8, 33.4, 33.6, 41